United States Patent Office 3,398,154
Patented Aug. 20, 1968

3,398,154
BIPYRIDYLIUM COMPOUNDS AND HERBICIDAL COMPOSITIONS CONTAINING THE SAME
John Edward Downes, Bracknell, England, assignor to Imperial Chemical Industries Limited, London, England, a corporation of Great Britain
No Drawing. Filed Apr. 27, 1965, Ser. No. 451,344
Claims priority, application Great Britain, Apr. 29, 1964, 17,785/64
8 Claims. (Cl. 260—295)

ABSTRACT OF THE DISCLOSURE 4,4'-bipyridylium quaternary salt herbicides wherein one or both of the nitrogen heteroatoms of the 4,4'-bipyridyl nucleus are linked to the nitrogen atom of an amino or acylamido group.

---

This invention relates to new 4,4'-bipyridylium compounds and to herbicidal compositions containing the same.

In recent times new herbicides have been discovered which contain as the active ingredient a bipyridylium compound comprising a cation which consists of a 4,4'-bipyridylium nucleus having a quaternising group attached to either or both of the nitrogen hetero atoms of the nucleus, and an anion. The compounds known hitherto are characterised by the fact that the quaternising group contains at least one carbon atom which forms a quaternising link with a nitrogen atom of the bipyridylium nucleus. We have now discovered new 4,4'-bipyridylium compounds wherein the quaternising group contains a nitrogen atom which forms a quaternising link with a nitrogen hetero atom of the 4,4'-bipyridylium nucleus.

Accordingly this invention provides new 4,4'-bipyridylium compounds comprising a cation having a 4,4'-bipyridylium nucleus wherein a nitrogen hetero atom of the nucleus forms a connective quaternising link with a nitrogen atom of a nitrogen-containing quaternising group, and an anion.

Examples of suitable quaternising groups are amino and formamido.

The compounds may bear one or two of the nitrogen-containing quaternising groups. When two are present they may be the same or different. The invention also includes compounds wherein one of the nitrogen hetero atoms is either unquaternised or bears a hydrogen atom or a quaternising group in which the quaternising link is between the nitrogen hetero atom and a carbon atom of the quaternising group. When the quaternising group forms a carbon to nitrogen link it may be an alkyl or substituted alkyl group having preferably from one to six carbon atoms. Substituted or unsubstituted methyl or ethyl groups are preferred. When the alkyl group is substituted it may bear as a substituent an alkoxy group, carbamoyl group, carbonyl alkyl group, a carbonyl alkoxy group, a carboxyl group or a hydroxy group.

The nature of the anion can vary considerably. Thus the anion may be bound by a covalent link to the 4,4'-bipyridylium nucleus as is the case when the nitrogen-containing quaternising group is itself negatively charged. In this case the compound has a betaine structure. When the anion is not covalently bound it is preferably a halide ion, for example a chloride, bromide or iodide ion, or it may be a sulphate ion having the formula: $[YSO_4]^-$ wherein Y is an atom of metal, especially an alkali metal or an alkaline earth metal, particularly sodium or potassium. Y may also be an ammonium or substituted ammonium group.

The compounds are obtainable by a variety of methods the suitability of any one of which depends largely upon the structure of the particular compound which is to be made. Compounds having one or two amino groups as quaternising groups are obtainable readily by warming an aqueous solution of a 4,4'-bipyridyl, which may be used in the form of its hydrate, with a salt of hydroxylamine-O-sulphonic acid. Suitable salts include ammonium, substituted ammonium, alkali metal or alkaline earth metal salts. In general the potassium salt has been found very convenient to use. The reaction mixture usually contains a mixture of two 4,4'-bipyridylium compounds, one of which has one amino quaternising group and the other has two. The relative proportions in which the two compounds are present may be altered by carrying out the process using either an excess of the bipyridyl or an excess of the salt of the hydroxyl-amine-O-sulphonic acid depending upon whether the mono- or di-amino compound is required. The two compounds can be separated readily by conversion into their corresponding iodides and subsequent fractional precipitation of the iodides from the aqueous solutions.

4,4'-bipyridylium compounds wherein the quaternising group is a formamido group are obtained most conveniently by bringing the corresponding amino compound into reaction with formic acid. Compounds having an $\overline{N}$—CHO quaternising group are obtainable by converting the salts of the corresponding formamide compounds. During this process hydrogen halide is liberated and the corresponding betaine is formed. 4,4'-bipyridylium compounds having an amino quaternising group and a second quaternising group which forms a carbon to nitrogen quaternising link with one of the nitrogen hetero atoms of the 4,4'-bipyridyl nucleus, may be obtained by bringing a 4,4'-bipyridyl compound having a single amino quaternising group into reaction with a conventional quaternising agent. Since the amino group which is present displays a low order of reactivity because of its function as a quaternising group, quaternising of the nitrogen hetero atom takes place in preference to reaction with the amino group.

The herbicidal activity of the present compound is not dependent greatly on the nature of the anion although this may affect in some measure the capacity of a particular compound to form a strong aqueous solution and the cheapness with which the compound can be made and these are both important considerations affecting the use of a herbicide. For certain purposes however a particular anion or mixture of anions may be desirable and compounds containing a predetermined anion or mixture of anions may be obtained either directly, by bringing a bipyridyl into reaction with a quaternising agent having the desired anions, or indirectly, by first forming the compound containing an undesired anion and then replacing the latter by the anion which is desired. Thus Example 1 illustrates inter alia the replacement of a potassio sulphonate ion by an iodide ion.

The compounds are converted preferably into compositions to assist in their storage, transport or application. The compositions may be solid in which case they will contain a solid diluent which preferably does not act as base exchange material or if soluble in water does not form a solution which is strongly alkaline. Suitable solid diluents include magnesium sulphate, sodium sulphate, sodium acetate, vermiculite, magnesium carbonate and cellulose ethers. Solid compositions may also contain a surface active agent and for certain purposes the solid diluent may also comprise the surface active agent.

More conveniently the compositions may be liquid and preferably comprise aqueous solutions containing a surface active agent which is preferably cationic or non ionic in character. Suitable surface active agents include condensation products of ethylene oxide with various substances, for example with an alkylated phenol such octyl phenol, and nonyl phenol; sorbitan monolaurate, oleyl alcohol, cetyl alcohol and propylene oxide polymer. Very good results are obtainable by using condensation products of ethylene oxide with long chain aliphatic amines containing from 10 to 20 carbon atoms.

The composition may also contain other ingredients, for example corrosion inhibitors including alkali or alkaline earth metal nitrites, benzoates, borates, orthophosphates and molybdates. Other herbicidal substances may also be present, for example substituted ureas, triazines and phenoxyacetic acids.

The compounds are conveniently made available by a supplier in the form of a concentrate which is a composition containing a high proportion of the compound and which is generally required to be diluted before application. Since the compounds are generally water-soluble preferred concentrates comprise strong aqueous solutions which may be diluted with water before use. The amount of a compound which may be used in a composition can vary between wide limits. In respect of compositions which are suitable for application without further dilution from 0.1 to 10.0% by weight of the compounds may be used, although from 0.1 to 5.0% is generally employed when hand based sprayers are used. Concentrates, on the other hand, may consist almost entirely of one or more of the compounds although in general those containing from 10 to 70% by weight of the compounds are generally more satisfactory. Some methods of application enable a composition containing a high proportion of a compound to be used without dilution. For example a convenient method of treating water weeds growing in rivers comprises suspending sacks containing pellets consisting of 50% by weight or more of the compound in admixture with a solid diluent in water up-stream of the weeds. In ths way the pellets gradually liberate the compound which is carried by the moving water into the environment of the weeds.

The present compounds are capable of controlling, that is killing or severely damaging, a wide variety of vegetation, whether it consists of broad leafed plants or grasses. Furthermore they have the advantage of being rapidly deactivated by soil so that when applied to vegetation they not only damage or destroy the vegetation but in addition, after a short time, any of the compound falling onto the ground is rendered harmless by the ground which soon after the application is in a sufficiently safe condition for it to be used for the growing of crops.

This invention is illustrated by the following examples.

EXAMPLE 1

This example illustrates the preparation of 1,1'-diamino-4,4'-bipyridylium dipotassio sulphonate and the conversion of the compound into 1,1' diamino-4,4'-bipyridylium diiodide having the formula:

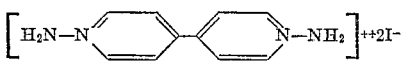

Hydroxylamine-O-sulphonic acid (11.3 g.) was dissolved in water (20 ml.) and neutralised with 5-molar potassium hydroxide solution (20 ml.) at 0° C. The solution was then added dropwise at the same temperature over a period of over fifteen minutes to a stirred solution warmed to 70° C. consisting of 4,4'-bipyridyl (7.8 g.) dissolved in water (30 ml.).

When the addition had been completed the solution was allowed to cool for 45 minutes and then treated with potassium carbonate (6.9 g.) dissolved in a minimum quantity of water. This resulted in precipitation of potassium sulphate the precipitation of which was completed by addition of methanol. The solution of the bipyridylium compound in the form of a carbonate was then separated by filtering off the potassium sulphate.

The carbonate was then converted into the corresponding diiodide by treating the solution with sufficient hydriodic acid (d 1.7) to render the solution just acid. Impure 1,1'-diamino-4,4'-bipyridylium diiodide separated as a brown solid and was recrystallised from water. The resulting product formed yellow crystals (5.5 g.) which melted with decomposition at 210° C.

EXAMPLE 2

This example illustrates the preparation of 1,1(-diformamido-4,4'-bipyridylium diiodide having the formula:

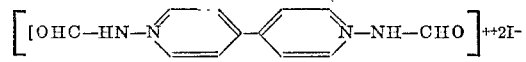

1,1'-diamino-4,4'-bipyridylium diiodide (1.3 g.) prepared according to the method described in Example 1 was heated under reflux with formic acid (20 ml.) for 3 hours. The acylated product was obtained by cooling the reaction mixture, filtering off a brown solid which was precipitated, and then evaporating the filtrate under reduced pressure until a red solid was deposited. This was then washed with ethanol and dried at 100° C. On analysis the solid was found to consist of a mixture of 80% by weight of the required compound and 20% by weight of a betaine having the formula:

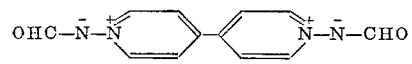

EXAMPLE 3

This example illustrates the preparation of 1-amino-4-(4'-pyridyl) pyridinium iodide hydriodide having the formula:

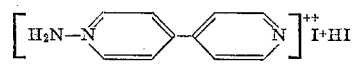

Hydroxylamine-O-sulphonic acid (22.6 g.) dissolved in water (40 ml.) was neutralised at 0° C. with 5 M potassium hydroxide solution (40 ml.). A solution of 4,4'-bipyridyl dihydrate (19.2 g.) in hot water (60 ml.) was added at one addition and the mixture then heated on a steam bath for 25 minutes. The temperature of the solution during this period was maintained at 84° C.

A concentrated aqueous solution of potassium carbonate (13.8 g. $K_2CO_3$) was then added, followed by methanol (250 ml.). Potassium sulphate was precipitated and was removed by filtration. The filtrate was then made acid with concentrated hydriodic acid during which process crystals of 1,1'-diamino-4,4'-bipyridylium diiodide were deposited and removed.

The filtrate was then cooled to −10° C. and as a result the required product, in an impure form, was precipitated. The product was removed by filtration, washed with alcohol and recrystallised from water. 1-amino-4-(4'-pyridyl) pyridinium iodide hydriodide (6.2 g.) was obtained as orange plates, which melted with decomposition at 175° C.

EXAMPLE 4

This example illustrates a liquid concentrate which contains a surface active agent and a corrosion inhibitor. This concentrate is preferably diluted with water prior to use.

| | Percent by wt. |
|---|---|
| 1,1'-diamino - 4,4' - bipyridylium potassio sulphonate | 25.0 |
| Condensation product of ethylene oxide with nonyl phenol | 5.0 |
| Sodium metaborate | 1.0 |
| Sodium benzonate | 2.0 |
| Water | 67.0 |

EXAMPLE 5

This example illustrates a composition comprising granules which are capable of dissolving readily in water to form an aqueous solution suitable for herbicidal purposes.

| | Percent by wt. |
|---|---|
| 1,1'-diformamido-4,4'-bipyridylium diiodide | 10.0 |
| Magnesium sulphate | 67.8 |
| Sodium molybdate | 0.2 |
| Potassium phosphate | 2.0 |
| Condensation product of ethylene oxide with nonyl phenol | 10.0 |
| Water | 10.0 |

EXAMPLE 6

This example illustrates the herbicidal activity of the present compounds when used at a high dilution.

Aqueous compositions were made containing 0.2% by weight of the compound described in Example 1 and the bipyridylium diiodide of Example 2. The required quantities of each of the compounds were dissolved in water containing 0.1% of a surface active agent comprising a condensation product of ethylene oxide with nonyl phenol. The compositions were then sprayed onto a group of broad leafed plants including sugar beet, kale, mustard, clover, may weed and red shank. A similar test was carried out on various grasses including wheat, cocksfoot, wild oats and barley. After 14 days the amount of damage inflicted on the plants was assessed. It was found that with a composition containing 1,1'-diamino-4,4'-bipyridylium diiodide 70% of the broad leafed plants were either killed or severely damaged while 55% of the grasses were similarly affected.

When a similar test was caried out with 1,1'-diformamido-4,4'-bipyridylium diiodide the results were 47% with respect to the broad leafed plants and 30% with respect to the grasses.

EXAMPLE 7

This example illustrates the immediate deactivation of the compounds when brought into contact with soil.

Seed beds were sprayed with compositions described in Example 3. After the treatment and on the same day the beds were sown with seeds of sugar beet, kale, mustard, clover, wheat, cocksfoot, wild oats and barley. After 14 days young seedlings appeared in substantially the same number in the treated beds as those which appeared in beds which had not been treated with the compositions, but which had been sown with the seeds of the same plants.

What we claim is:

1. A 4,4'-bipyridylium compound consisting of a cation having a 4,4'-bipyridylium nucleus wherein a nitrogen heteroatom of the nucleus is linked to the nitrogen atom of a nitrogenous radical selected from the group consisting of amino and formamido, and an anion.

2. A 4,4'-bipyridylium compound according to claim 1 wherein both the nitrogen heteroatoms of the bipyridylium nucleus are linked to the nitrogen atom of nitrogenous radicals selected from the group consisting of amino and formamido, and an anion.

3. A compound of the formula:

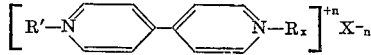

wherein R' and R are selected from the group consisting of amino and formamido joined through their nitrogen atom to the nitrogen heteroatom of the nucleus; $x$ is 0 or 1, $n$ is $x+1$ and X is an anion.

4. A compound according to claim 3 wherein $x$ is 1 and $n$ is 2.

5. A 4,4'-bipyridylium compound according to claim 2 wherein the nitrogen heteroatoms of the bipyridylium nucleus are linked to the nitrogen atom of an amino group.

6. A 4,4'-bipyridylium compound according to claim 1 wherein the compound is a 1,1'-diamino-4,4'-bipyridylium halide.

7. A 4,4'-bipyridylium compound according to claim 1 wherein the compound is a 1,1'-diformamido-4,4'-bipyridylium halide.

8. A process of making a compound of claim 3 comprising bringing 4,4'-bipyridyl into reaction with an alkali metal salt of hydroxylamine-O-sulphonic acid in aqueous solution.

No references cited.

HENRY R. JILES, *Primary Examiner.*

A. L. ROTMAN, *Assistant Examiner.*